(12) United States Patent
Pappalardo et al.

(10) Patent No.: US 7,143,302 B2
(45) Date of Patent: Nov. 28, 2006

(54) PIPELINE STRUCTURE

(75) Inventors: Francesco Pappalardo, Paterno (IT);
Agatino Pennisi, Nocera Inferiore (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 306 days.

(21) Appl. No.: 10/622,835

(22) Filed: Jul. 18, 2003

(65) Prior Publication Data
US 2004/0103334 A1 May 27, 2004

(30) Foreign Application Priority Data
Jul. 19, 2002 (EP) ................................ 02425469

(51) Int. Cl.
*G06F 1/04* (2006.01)
*G06F 1/06* (2006.01)
*G06F 1/08* (2006.01)

(52) U.S. Cl. ...................... 713/500; 713/500; 713/400; 713/401; 345/506; 345/29

(58) Field of Classification Search ................ 708/301, 708/406, 425, 508, 521, 631, 233, 818; 712/219; 345/506; 713/375, 400–601
See application file for complete search history.

(56) References Cited

U.S. PATENT DOCUMENTS

| | | | | |
|---|---|---|---|---|
| 5,392,423 A | * | 2/1995 | Yetter ......................... | 713/503 |
| 5,670,899 A | * | 9/1997 | Kohdaka ...................... | 326/97 |
| 5,909,638 A | * | 6/1999 | Allen .......................... | 725/146 |
| 6,122,751 A | * | 9/2000 | Janssens et al. ............ | 713/600 |
| 6,154,798 A | * | 11/2000 | Lin et al. ...................... | 710/72 |
| 6,956,423 B1 | * | 10/2005 | Neff ........................... | 327/291 |

OTHER PUBLICATIONS

Moshnyaga, V.G. et al., "Energy Saving Techniques for Architecture Design of Portable Embedded Devices," ASIC Conference and Exhibit 1997 Proceedings, Tenth Annual IEEE, International Portland, OR, USA Sep. 7-10, 1997, New York, NY IEEE Sep. 7, 1997, XP010243383, pp. 163-167, ISBN: 0-7803-4283-6.
European Search Report for application No. EP 02 42 5469 dated Jul. 1, 2003.

* cited by examiner

*Primary Examiner*—James K. Trujillo
*Assistant Examiner*—James F. Sugent
(74) *Attorney, Agent, or Firm*—Lisa K. Jorgenson; Stephen Bongini; Fleit, Kain, Gibbons, Gutman, Bongini & Bianco P.L.

(57) ABSTRACT

A pipeline structure is provided for use in a digital system. The pipeline structure includes stages arranged in a sequence from a first stage for receiving an input of the pipeline structure to a last stage for providing an output of the pipeline structure. At least one intermediate stage is interposed between the first stage and the last stage. The pipeline structure also includes a phase shifting circuit for generating at least one local clock signal for controlling the at least one intermediate stage. The first stage and the last stage are controlled by a main clock signal, the at least one local clock signal is generated from the main clock signal, and the main clock signal and the at least one local clock signal are out of phase. Also provided is a method of operating a pipeline structure that includes stages arranged in a sequence.

11 Claims, 3 Drawing Sheets

PIPELINE STRUCTURE

CROSS-REFERENCE TO RELATED APPLICATIONS

This application is based upon and claims priority from European Patent Application No. 02425469.0, filed Jul. 19, 2002, the entire disclosure of which is herein incorporated by reference.

BACKGROUND OF THE INVENTION

1. Field of the Invention

The present invention relates to digital systems, and more specifically to a pipeline structure for use in a digital system.

2. Description of Related Art

A pipeline structure consists of a sequence of functional units (stages), which perform a task in several steps; the stages work in parallel thus giving higher throughput than if all the steps had to be completed before starting a next task. Pipelines are commonly used in several applications, for example, to process different parts of an instruction in a microprocessor.

Typically, the pipeline has a synchronous architecture. A synchronous pipeline receives a single clock signal, which controls all the stages. As a consequence, every stage must complete its work within one clock period.

A drawback of the synchronous pipeline is that all the stages switch at the same time. This involves high peaks of power consumption (due to the current dissipated by the short-circuits that are formed during the switching of the transistors of the logic gates, and to the current needed for charging and discharging wires and capacitors). These peaks of power consumption introduce sources of noise, which can jeopardize the functionality of the whole electronic device that embeds the pipeline. Moreover, they impose several constrains in the design of a power supply structure; particularly, metal tracks used to supply the electronic device (when integrated in a chip of semiconductor material) must be dimensioned so as to withstand the aforementioned high peaks. As a consequence, an increased area of the chip is required to integrate the electronic device.

Asynchronous pipelines have been proposed in order to reduce the peaks of power consumption. In an asynchronous pipeline, all the stages proceed independently (so that they do not switch at the same time). A handshaking mechanism is then used to maintain every pair of adjacent stages in synchronization. For this purpose, each stage generates a signal indicative of the completion of its work. This signal is used to move the result of the stage to a next stage, and then to trigger starting of the next stage.

However, the implementation of the handshaking mechanism is relatively complex. Moreover, an additional circuit is required to synchronize the flux of input and output information with the external circuitry.

SUMMARY OF THE INVENTION

In view of these drawbacks, it is an object of the present invention to overcome the above-mentioned drawbacks and to provide an improved pipeline structure.

Briefly, one embodiment of the present invention provides a pipeline structure for use in a digital system. The pipeline structure includes stages arranged in a sequence from a first stage for receiving an input of the pipeline structure to a last stage for providing an output of the pipeline structure. At least one intermediate stage is interposed between the first stage and the last stage. The pipeline structure also includes a phase shifting circuit for generating at least one local clock signal for controlling the at least one intermediate stage. The first stage and the last stage are controlled by a main clock signal, the at least one local clock signal is generated from the main clock signal, and the main clock signal and the at least one local clock signal are out of phase.

Moreover, embodiments of the present invention provide a digital system including such a pipeline structure, and an electronic device including such a digital system.

A further embodiment of the present invention provides a method of operating a pipeline structure that includes stages arranged in a sequence. The sequence includes a first stage for receiving an input of the pipeline structure to a last stage for providing an output of the pipeline structure, with at least one intermediate stage being interposed between the first stage and the last stage. According to the method, the first stage and the last stage are controlled with a main clock signal, and at least one local clock signal is generated from the main clock signal. The main clock signal and the at least one local clock signal are out of phase, and the at least one intermediate stage is controlled with the at least one local clock signal.

Other objects, features and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
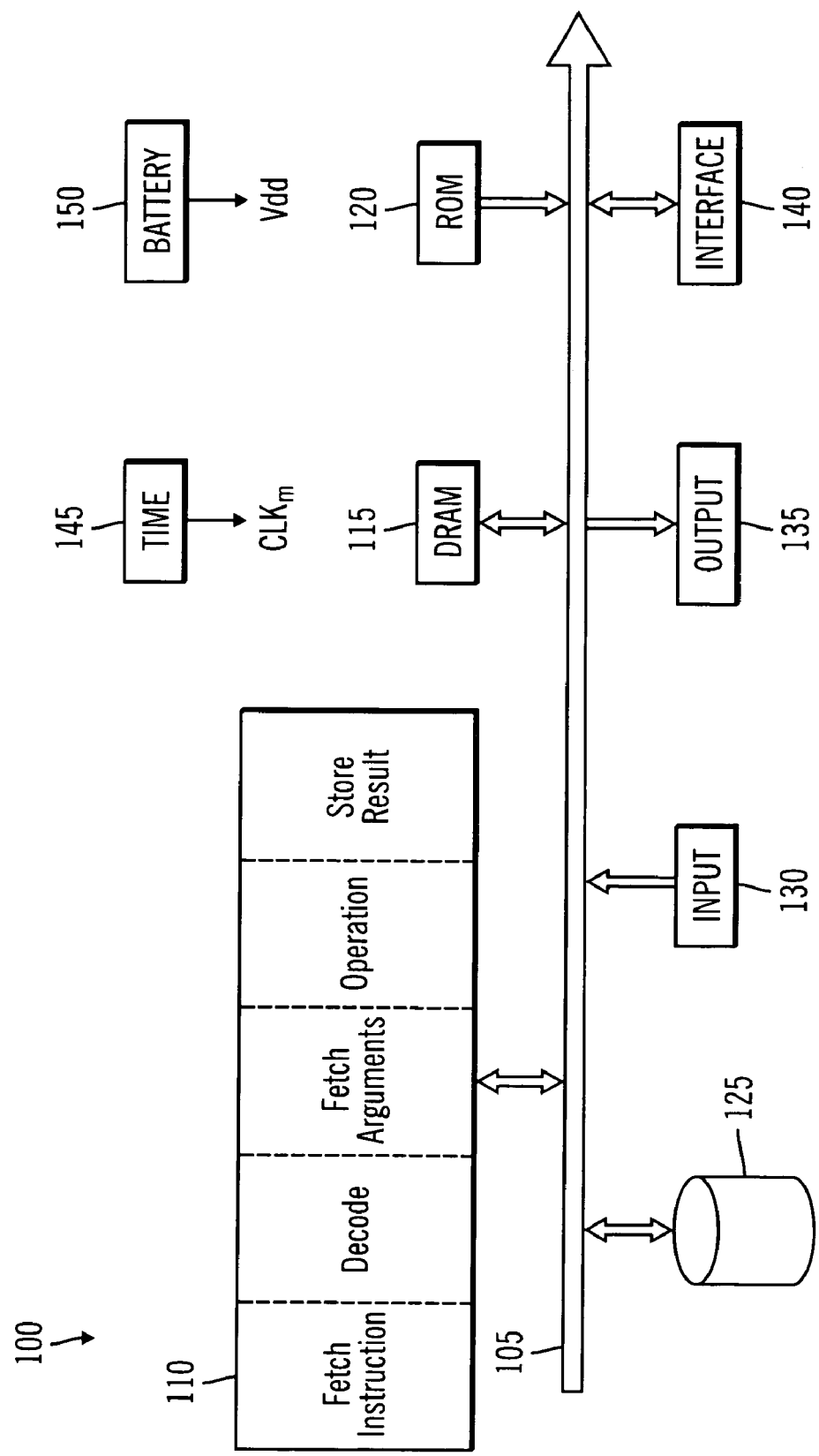
FIG. 1 is a block diagram of a hand-held computer in which the pipeline structure of the present invention can be used.

FIG. 1 shows a hand-held computer 100. The hand-held computer 100, also known as palmtop, pocket computer or Personal Digital Assistants (PDA), is a very small system that literally fits in one hand. The hand-held computer 100 is formed by several units, which are connected in parallel to a communication bus 105. In detail, a microprocessor 110 controls operation of the hand-held computer 100, a DRAM 115 is directly used as a working memory by the microprocessor 110, and a Read Only Memory (ROM) 120 stores basic code for a bootstrap of the hand-held computer 100.

Several peripheral units are further connected to the bus 105. Particularly, a non-volatile memory 125, typically consisting of a flash $E^2$PROM, operates as a solid-state mass memory for the hand-held computer 100. Moreover, the hand-held computer 100 includes input devices 130 (for example, an electronic pen or stylus), and output devices 135 (for example, a flat panel screen made with a TFT technology). Interfaces 140 are used to connect external peripherals (such as a PCMCIA network card) to the hand-held computer 100.

A timing unit 145 generates a main clock signal $CLK_m$, which is used to synchronize operation of the hand-held computer 100. A battery pack 150 provides a power supply voltage Vdd for all the units of the hand-held computer 100, so as to enable the hand-held computer 100 to run without being plugged in.

The microprocessor 110 has a pipeline architecture, wherein a sequence of stages simultaneously processes different parts of every instruction to be executed by the microprocessor 110. Particularly, a first stage fetches the instruction (from the DRAM 115), a second stage decodes the instruction, a third stage fetches the arguments (if any), a fourth stage executes the operations required by the instruction, and a fifth stage stores a possible result. In this way, as one instruction is executed, the next instruction is being decoded and the one after that is being fetched. For maximum performance, the pipeline requires a continuous stream of instructions; therefore, this technique is commonly combined with instruction prefetch in an attempt to keep the pipeline busy.

Similar considerations apply if the hand-held computer has a different structure or includes other units (for example, an infrared port), if the pipeline is formed by a different number of stages, if no prefetch is implemented, if each stage performs other functions, and the like. Alternatively, the pipeline is used in the microprocessor of a laptop computer, in a mobile telephone, in a memory (wherein data is saved in a stack while the next data is being accessed), or more generally in any other digital system.

Figure 2:
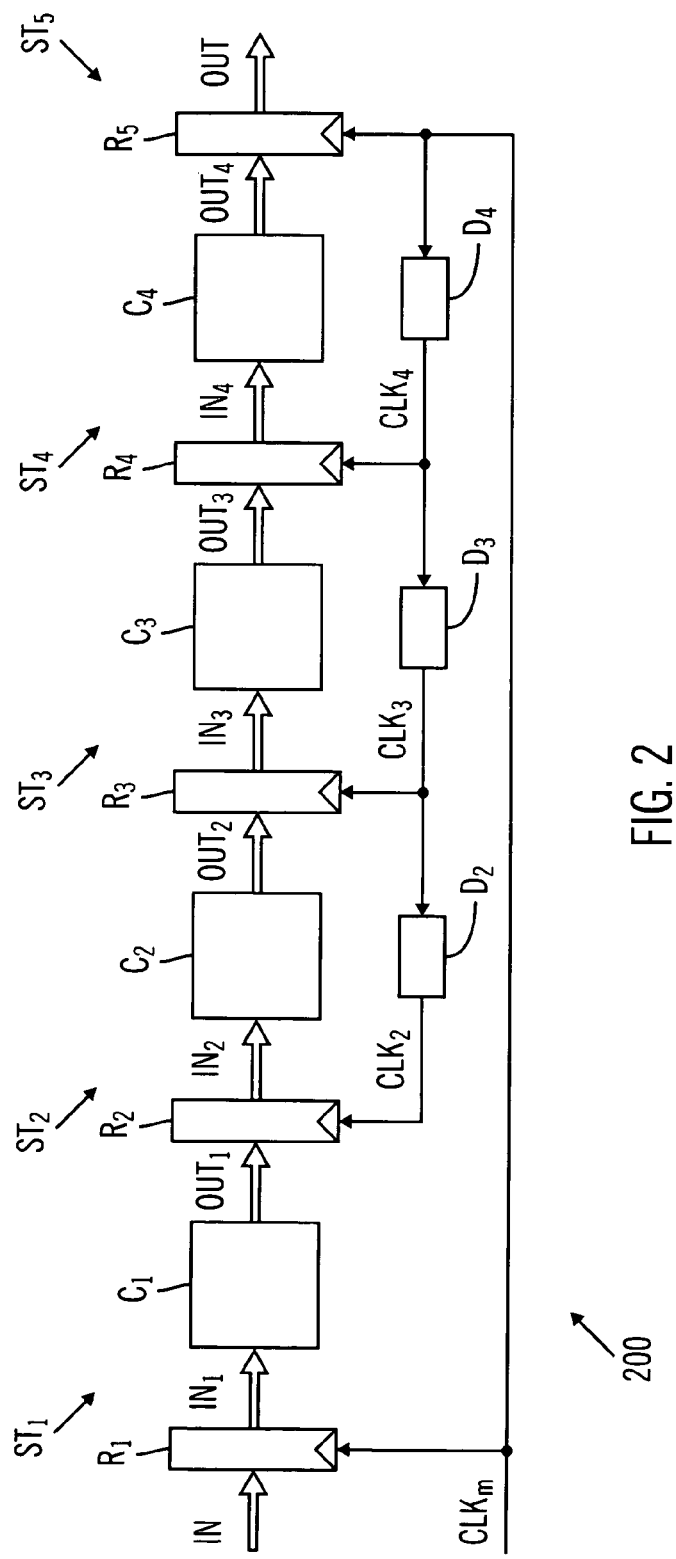
FIG. 2 illustrates the functional blocks of a pipeline structure according to a preferred embodiment of the present invention.

FIG. 2 shows a pipeline structure according to a preferred embodiment of the present invention for use in the microprocessor of the hand-held computer. The pipeline structure 200 is formed by N=5 stages $ST_i$ (with i=1 ... N). Each stage $ST_i$ includes a register $R_i$ and a combinatorial circuit $C_i$ (except for the last stage $ST_5$, which only has the register $R_5$ without any combinatorial circuit). The combinatorial circuit $C_i$ is cascade connected to the corresponding register $R_i$; the register $R_1$ (of the first stage $ST_1$) and the register $R_5$ (of the last stage $ST_5$) define an input and an output, respectively, of the pipeline 200.

An input word IN (for example, of 32 bits) received by the pipeline 200 is stored in the register $R_1$ (as a word $IN_1$). Each register $R_i$ (with the exception of the last one) operates as an input buffer for the corresponding combinatorial circuit $C_i$. The combinatorial circuit $C_i$ processes a word $IN_i$ provided by the register $R_i$, and generates a result consisting of a word $OUT_i$; the combinatorial circuit $C_i$ has a propagation time $P_i$ (defined as the delay for obtaining the word $OUT_i$ from the word $IN_i$). The output of the combinatorial circuit $C_i$ is then stored in the next register $R_{i+1}$ (so that $IN_{i+1}=OUT_i$). The word stored in the last register $R_5$ ($OUT_4$) is output as the output word OUT of the pipeline 200.

Operation of the pipeline 200 is controlled by the main clock signal $CLK_m$. Particularly, each register $R_i$ has a control terminal, which is used to trigger the loading of the word supplied at its input (word IN for the register $R_1$ and word $IN_i$ for the other registers $R_2$–$R_5$). The first register $R_1$ and the last register $R_5$ are directly controlled by the main clock signal $CLK_m$. The other registers $R_2$–$R_4$ (of the intermediate stages $ST_2$–$ST_4$) are controlled by local clock signals $CLK_2$–$CLK_4$, respectively. The local clock signals $CLK_2$–$CLK_4$ are generated from the main clock signal $CLK_m$ using a phase shifting circuit. This circuit has a delay block $D_i$ for each intermediate stage $ST_i$. The block $D_i$ generates the corresponding local clock signal $CLK_i$ by applying a pre-set delay $d_i$ to the clock signal controlling the next stage $ST_{i+1}$; in other words, the local clock signals $CLK_2$, $CLK_3$ and $CLK_4$ are generated by delaying the clock signals $CLK_3$, $CLK_4$ and $CLK_m$, respectively. The delay blocks $D_2$–$D_4$ ensure that the main clock signal $CLK_m$ and every local clock signal $CLK_i$ are out of phase, so that all of the registers $R_1$–$R_5$ never switch at the same time.

Similar considerations apply if the pipeline includes a different number of stages (down to three), if the word consists of a different number of bits, if the registers are replaced with equivalent buffers, if a further combinatorial circuit is connected to the last register, if the first register is missing, and so on.

Figure 3:
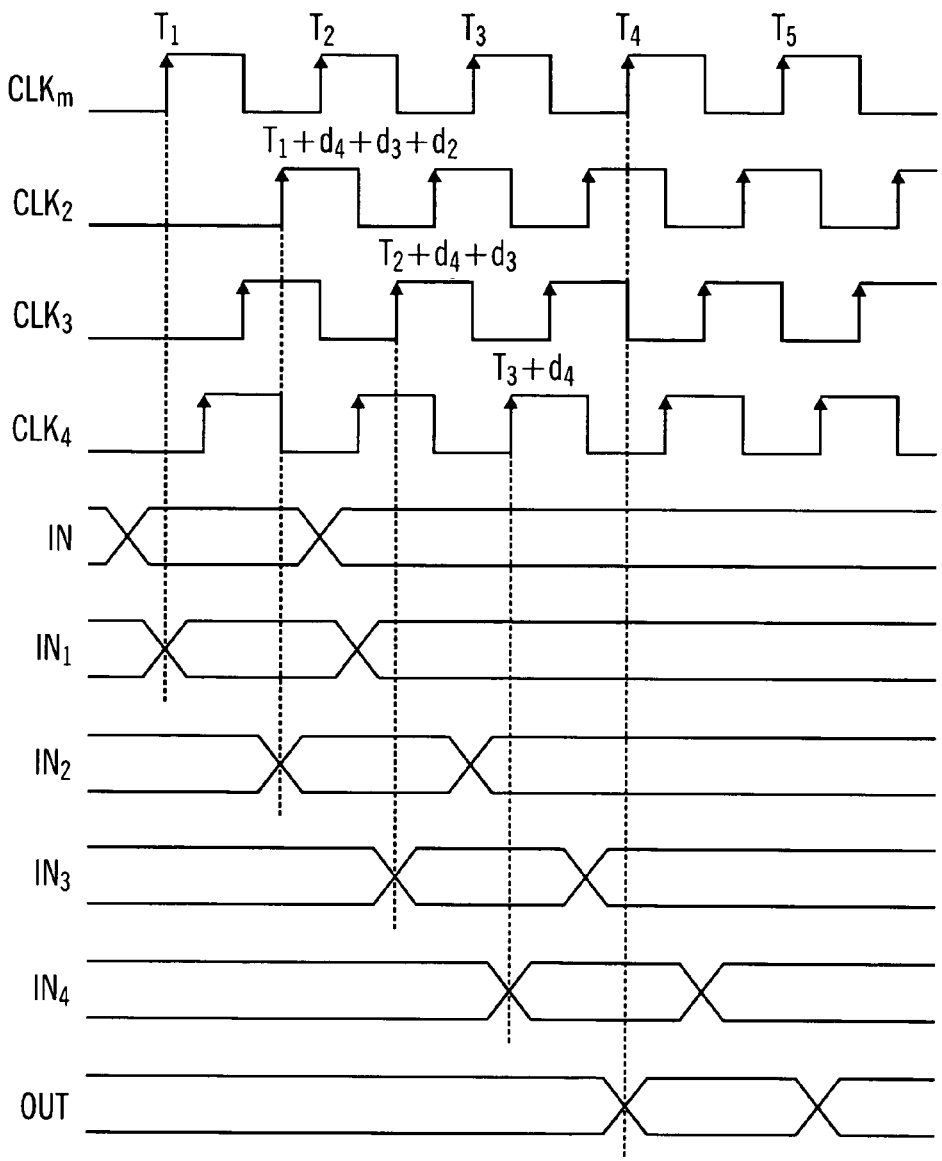
FIG. 3 is a timing diagram showing operation of the pipeline structure of FIG. 2.

Operation of the pipeline structure described above is shown in the simplified timing diagram of FIG. 3. The various signals are switched at the rising edge of the respective clock signal ($CLK_m$, $CLK_2$–$CLK_4$); each word is represented by a band (the crossing points of the band define the switching times). The input word IN is loaded into the first register $R_1$ (word $IN_1$) at the time $T_1$ (in response to the rising edge of the main clock signal $CLK_m$). The word $IN_1$ is processed by the combinatorial circuit $C_1$; the output of the combinatorial circuit $C_1$ (word $OUT_1$) is stored in the second register $R_2$ (word $IN_2$) at the next rising edge of the local clock signal $CLK_2$ (time $T_1+d_4+d_3+d_2$). In a similar manner, the output of the combinatorial circuit $C_2$ (word $OUT_2$) is stored in the third register $R_3$ (word $IN_3$) at the next rising edge of the local clock signal $CLK_3$ (time $T_2+d_4+d_3$). The output of the combinatorial circuit $C_3$ (word $OUT_3$) is likewise stored in the fourth register $R_4$ (word $IN_4$) at the next rising edge of the local clock signal $CLK_4$ (time $T_3+d_4$). The word $IN_4$ is then processed by the combinatorial circuit $C_4$; the output of the combinatorial circuit $C_4$ (word $OUT_4$) is stored in the last register $R_5$ (providing the output word OUT) at the next rising edge of the main clock signal $CLK_m$ (time $T_4$). Therefore, three clock periods ($T_1$–$T_4$) are needed to pass through the entire pipeline (in order to get the output word OUT corresponding to the input word IN).

Correct operation of the pipeline requires that a new word cannot be written into a register before the previous one has been used (by the corresponding combinatorial circuit). Particularly, a generic word $IN_i$ is supplied to the combinatorial circuit $C_i$ as soon as it is loaded into the corresponding register $R_i$. The combinatorial circuit $C_i$ generates the resulting word $OUT_i$ after the respective propagation time $P_i$. In order to ensure that the combinatorial circuit $C_i$ has completed its work before the word $OUT_i$ is stored in the next register $R_{i+1}$, the difference between the switching times of the registers $R_{i+1}$ and $R_i$ must be greater than the propagation time $P_i$ of the combinatorial circuit $C_i$.

Considering in particular the first stage $ST_1$, the register $R_1$ switches at every rising edge of the main clock signal $CLK_m$ (for example, $T_1$); the second register $R_2$ switches at the time $$T_1 + d_4 + d_3 + d_2 = T_1 + \sum_{j=2}^{N-1} d_j.$$

Therefore, the following relation must be met:

$$T_1 + \sum_{j=2}^{N-1} d_j - T_1 \geq P_1$$

$$\sum_{j=2}^{N-1} d_j \geq P_1$$

Denoting with $T_m$ the time of a generic rising edge of the main clock signal $CLK_m$, a register $R_i$ of any intermediate stage (from $ST_2$ to $ST_4$) switches at the time $$T_m + \sum_{j=i}^{N-1} d_j;$$

the next register $R_{i+1}$ switches at the time $$T_{m+1} + \sum_{j=i+1}^{N-1} d_j = T_m + T + \sum_{j=i+1}^{N-1} d_j$$

(where T is the period of the main clock signal $CLK_m$). Therefore, the restraint applicable to every intermediate stage is:

$$T_m + T + \sum_{j=i+1}^{N-1} d_j - \left( T_m + \sum_{j=i}^{N-1} d_j \right) \geq P_i$$

$$T - d_i \geq P_i$$

Finally, the register $R_4$ switches at the time $T_3+d_4$ and the register $R_5$ switches at the time $T_4=T_3+T$, so that the following condition must be met for the last stage:

$$T_3+T-(T_3+d_4) \geq P_4$$

$$T-d_4 \geq P_4$$

Similar considerations apply if a different timing is envisaged for the pipeline, if the signals are strobed after two or more clock periods from their switching, if the difference between the switching times of the adjacent registers is greater than the clock period, and so on.

More generally, the present invention proposes a pipeline structure for use in a digital system. The pipeline structure includes a plurality of stages arranged in a sequence from a first stage (for receiving an input of the pipeline structure) to a last stage (for providing an output of the pipeline structure); one or more intermediate stages are interposed between the first stage and the last stage. The first stage and the last stage are controlled by a main clock signal. In the pipeline structure of preferred embodiments of the present invention, phase shifting means or circuitry is provided for generating one or more local clock signals (from the main clock signal) for controlling the intermediate stages; the main clock signal and the local clock signals are out of phase.

The proposed solution greatly reduces the peaks of power consumption in the pipeline structure. In this way, less sources of noise are introduced. Moreover, the constraints in the design of a power supply structure for the whole electronic device that embeds the pipeline are relaxed; particularly, metal tracks used to supply the electronic device (when integrated in a chip of semiconductor material) may be smaller. As a consequence, a reduced area of the chip is required to integrate the electronic device.

This result is achieved with a very simple architecture, without any handshaking mechanism being required between the stages of the pipeline.

In addition, the pipeline structure of preferred embodiments of the present invention maintains a synchronous interface with external circuitry (for the flux of input and output information). Further, the proposed solution makes it possible to reduce the number of clock periods required to pass through the entire pipeline (compared with the conventional synchronous pipeline), even if different timings are not excluded.

The preferred embodiment of the present invention described above offers further advantages. For example, the preferred pipeline structure has multiple intermediate stages, each one of which is controlled by a corresponding local clock signal (with all the local clock signals being out of phase). This feature further reduces the peaks of power consumption (since all the intermediate stages switch at different times).

Preferably, each local clock signal is obtained by delaying the clock signal controlling an adjacent stage.

The proposed structure is very simple, but at the same time effective.

As a further enhancement, each delay block preferably receives as input the clock signal of the next stage. This solution makes it possible to ensure correct operation of the pipeline with shorter delays (than if the local clock signals were obtained from the previous stage).

Alternatively, the local clock signals are not all out of phase, two or more stages are controlled by the same local clock signal, the pipeline includes a single intermediate stage, each local clock signal is obtained by delaying another clock signal (for example, the one controlling the previous stage), or different phase shifting means or circuitry are envisaged.

Preferably, each intermediate stage includes a functional unit and a buffer; the functional unit has a propagation time lower than the phase difference between the corresponding clock signal and the clock signal controlling the next stage. This structure better exploits the advantageous effects of the present invention (at the same time ensuring correct operation of the pipeline).

Preferably, each stage consists of a combinatorial circuit and a corresponding buffer (storing a word). In this way, the peaks of power consumption are reduced to the minimum.

However, the solution according to the present invention also leads itself to be implemented in a pipeline wherein each register consists of a stack with a depth of two or more words, or even in a pipeline having a different architecture (for example, consisting of a simple shift register without any combinatorial circuit).

Typically, the pipeline structure of the present invention is used in a digital system. The improvement provided by the synchronous interface of the proposed pipeline structure is clearly perceived in a digital system of the synchronous type.

Moreover, the solution according to the present invention is particularly advantageous in an electronic device that is supplied by a battery (wherein the power consumption is a very critical issue).

However, the pipeline of the present invention is also suitable for use in different digital systems (even of the asynchronous type), and in any other electronic device (for example, supplied by an electric main).

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A pipeline structure for use in a digital system, said pipeline structure comprising:
    a plurality of stages arranged in a sequence from a first stage for receiving an input of the pipeline structure to a last stage for providing an output of the pipeline structure, with at least two intermediate stages being interposed between the first stage and the last stage; and
    a phase shifting circuit for generating at least two local clock signals each for controlling a corresponding one of the at least two intermediate stages,
    wherein for each of the intermediate stages, the phase shifting circuit includes a delay block for producing the local clock signal controlling that intermediate stage from the clock signal controlling a next one of the stages in the sequence,
    the first stage and the last stage are controlled by a main clock signal,
    the at least two local clock signals are generated from the main clock signal, and
    the main clock signal and the at least two local clock signals are out of phase with one another.

2. The pipeline structure according to claim 1, wherein each of the intermediate stages includes a functional unit cascade connected to a buffer, the buffer storing an output of the functional unit of a previous one of the stages in the sequence based on the corresponding local clock signal, and the functional unit having a propagation time that is less than a phase difference between the corresponding local clock signal and the clock signal controlling the next one of the stages in the sequence.

3. The pipeline structure according to claim 2, wherein each of the functional units consists of a combinatorial circuit and each of the buffers consists of a register for storing a word.

4. The pipeline structure according to claim 1, wherein for each of the at least one intermediate stages, the phase shifting circuit includes a delay block for producing the local clock signal controlling that intermediate stage from the clock signal controlling one of the stages that is adjacent in the sequence.

5. A digital system including at least one pipeline structure, the pipeline structure comprising:
    a plurality of stages arranged in a sequence from a first stage for receiving an input of the pipeline structure to a last stage for providing an output of the pipeline structure, with at least two intermediate stages being interposed between the first stage and the last stage; and
    a phase shifting circuit for generating at least two local clock signals each for controlling a corresponding one of the at least two intermediate stages,
    wherein for each of the intermediate stages, the phase shifting circuit includes a delay block for producing the local clock signal controlling that intermediate stage from the clock signal controlling a next one of the stages in the sequence,
    the first stage and the last stage are controlled by a main clock signal,
    the at least two local clock signals are generated from the main clock signal, and
    the main clock signal and the at least two local clock signals are out of phase with one another.

6. The digital system according to claim 5, wherein the digital system is a synchronous digital system.

7. The digital system according to claim 5, wherein the digital system is a controller or microprocessor integrated in a chip.

8. An electronic device comprising:
    a digital system including at least one pipeline structure, the pipeline structure including:
        a battery for supplying power to the digital system;
        a plurality of stages arranged in a sequence from a first stage for receiving an input of the pipeline structure to a last stage for providing an output of the pipeline structure, with at least two intermediate stages being interposed between the first stage and the last stage, and the first stage and the last stage being controlled by a main clock signal; and
        a phase shifting circuit for generating at least two local clock signals each for controlling a corresponding one of the at least two intermediate stages, the at least two local clock signals being generated from the main clock signal, and the main clock signal and the at least two local clock signals being out of phases,
    wherein for each of the intermediate stages, the phase shifting circuit includes a delay block for producing the local clock signal controlling that intermediate stage from the clock signal controlling a next one of the stages in the sequence.

9. The electronic device according to claim 8, wherein the electronic device is a hand-held computer and the digital system is a controller or microprocessor of the hand-held computer.

10. A method of operating a pipeline structure that includes a plurality of stages arranged in a sequence from a first stage for receiving an input of the pipeline structure to a last stage for providing an output of the pipeline structure, with at least two intermediate stages being interposed between the first stage and the last stage, said method comprising the steps of:
    controlling the first stage and the last stage with a main clock signal;
    generating, with a delay block, at least two local clock signals from the main clock signal, the main clock signal and the at least two local clock signals being out of phase; and
    controlling each of the at least two intermediate stages with a different one of the at least two local clock signals, wherein each of the local clock signals is out of phase with the other and is produced from a next one of the stages in the sequence.

11. The method according to claim 10, wherein in the generating step, the local clock signal for each of the intermediate stages is generated from the clock signal controlling a next one of the stages in the sequence.

* * * * *